United States Patent Office 2,910,630
Patented Oct. 27, 1959

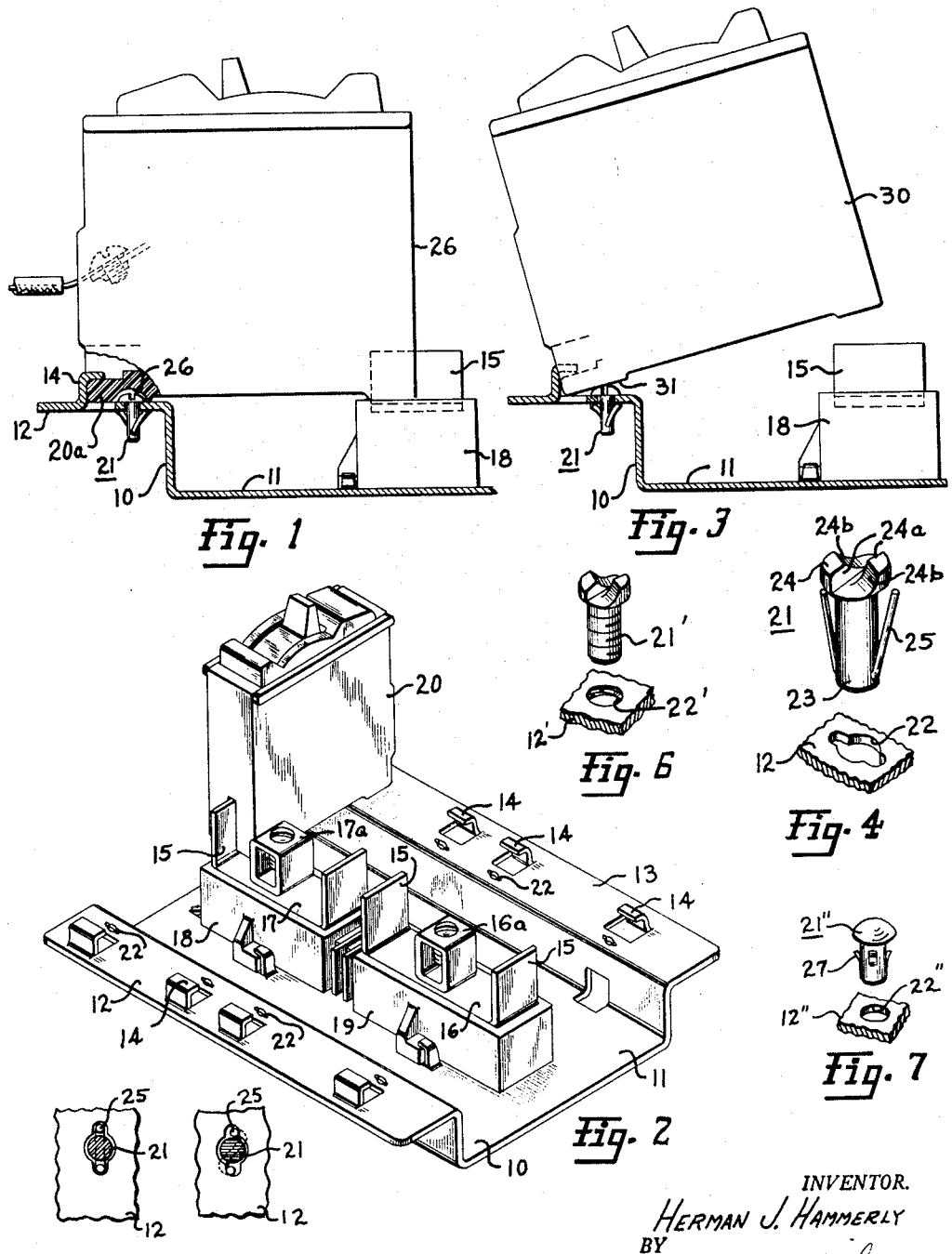

2,910,630

CIRCUIT BREAKER PANELBOARD

Herman J. Hammerly, Plainville, Conn., assignor to General Electric Company, a corporation of New York Application March 29, 1956, Serial No. 574,852

14 Claims. (Cl. 317—119)

My invention relates to circuit breaker panelboards and load centers and especially to such panelboards and load centers incorporating circuit breakers having at least one terminal thereof adapted to be connected by a plug-in type electrical connection. More specifically, the present invention is concerned with an improvement upon plug-in circuit breaker panelboards of the type disclosed in Patent No. 2,738,446, issued March 13, 1956, to William J. Fleming and assigned to the same assignee as the present invention.

The above patent discloses a circuit breaker panelboard including one or more bus bars and having a number of stations or locations, at each of which a circuit breaker may be mounted, electrical contact being made with a portion of a bus bar by a plug-in action. Such circuit breakers are made in various ampere ratings, such as 15, 20, 30 and 50 amperes, and the selection of a breaker of a given rating is dictated by the requirements of the circuit which it is intended to protect.

The installation of such panelboards and the initial selection and installation of the various breakers is ordinarily carried out by qualified personnel, and is subject to inspection and approval by civil authorities. It is, therefore, quite likely that such initial installations will be properly carried out, with due consideration being given to the requirements of the various circuits and devices to be protected.

Following such initial installation however, the user may occasionally attempt to change the installation. For instance, he may find that because of overloading of the branch circuits, a given circuit breaker "trips" or opens repeatedly, and he may attempt to replace such breaker with a breaker of higher rating to prevent such "nuisance tripping." Such replacement would, of course, defeat the protective function of the breaker and create a danger of fire. It is, therefore, extremely desirable that such replacement be discouraged, impeded or effectively prevented, the proper remedy for the trouble being the installation of additional protected circuits.

Accordingly, it is an important object of the present invention to provide an electric circuit panelboard of the type referred to, and circuit breakers for use therewith, wherein a circuit breaker of a given ampere rating cannot be mounted and energized at a location where a circuit breaker of lower ampere rating has once been inserted.

Another object of the invention is to provide such an electric circuit panelboard wherein the means utilized to prevent such incorrect mounting of circuit breakers is simple, inexpensive and easy to manufacture.

In accordance with my invention in one form, I provide an electric circuit breaker panelboard adapted to receive circuit breakers of two types which are substantially identical except for a minor difference in one portion of the casing. The panelboard further includes blocking means adapted to be non-removably attached to the panelboard and serving to prevent the mounting of a predetermined type of circuit breaker at that location by engagement with the afore-mentioned portion of its casing.

In accordance with another aspect of my invention, I provide a novel, simple and effective panelboard construction with breaker mounting means adapted to accept at least two types of circuit breakers but readily modifiable to reject one of said two types. In this aspect, my invention relates to circuit breaker panelboards of the type having at least one relatively stationary contact and breaker retaining means spaced away from said contact and adapted to receive a portion of the breaker casing whereby the breaker may have one end portion of its casing engaged with the retaining means and be rotated thereabout until a contact carried adjacent its other end is in engagement with the relatively stationary contact. My invention in this aspect provides such a panelboard having a portion closely adjacent the breaker pivotally retaining means adapted to receive a blocking element which, when in place, engages the critical portion of the casing of one type of circuit breaker to so limit rotation of the breaker about the retaining means that its contact cannot touch the stationary contact carried by he panelboard, but which is received by a conforming portion of the casing of the other type of breaker, permitting full mounting rotation thereof.

My invention will be more fully understood from the following detailed description taken into connection with the accompanying drawing in which:

Figure 1 is a side elevation view of a portion of a circuit breaker panelboard incorporating my invention, portions thereof being shown in section;

Figure 2 is a perspective view of a panelboard assembly incorporating my invention;

Figure 3 is a view similar to Figure 1 but showing the operation of the blocking element in preventing the mounting of a selected circuit breaker at a particular location;

Figure 4 is a perspective view on an enlarged scale of the blocking element as used in the panelboard of Figure 2;

Figures 5a and 5b are fragmentary views of a portion of the panelboard of Figure 1 showing the blocking element in its initially mounted and rotated positions, respectively;

Figures 6 and 7 are perspective views of modified forms of blocking elements.

In the drawing I have shown my invention as incorporated in a panelboard comprising a generally channel-shaped supporting member 10 having a generally central area 11 for supporting bus bars and bus bar contacts, and opposed outwardly extending generally planar circuit breaker supporting flanges 12 and 13. Each of the circuit breaker supporting flanges 12 and 13 has arranged along the edge thereof, in spaced relation, a number of circuit breaker retaining elements or hooks 14.

For the purpose of delivering power to electric circuit breakers, a number of line terminal contact blades 15 are provided, connected electrically to corresponding bus bars 16 and 17 supported on suitable insulating supports such as insulating blocks 18 and 19. Each of the bus bars 16 and 17 is provided with a connector 16a and 17a respectively, for use in connecting a power cable or wire to such bus bar. The panelboard assembly is adapted to receive a number of electric circuit breakers such as circuit breakers 20, 26 and 30, each of such circuit breakers being provided with an integral lug portion 20a at one end thereof. Each lug 20a is adapted to be received under one of the hook-shaped retaining elements 14, to permit the circuit breaker to be rotated about such engagement into a fully mounted position in which a blade-receiving contact or socket (not shown), adjacentthe other end of the casing, is moved into connected engagement with one of the contact blades 15.

In order to provide for the acceptance of selected circuit breakers and the rejection of other selected circuit breakers at predetermined breaker mounting locations, I provide blocking or discriminating elements 21 and corresponding apertures 22 in the breaker supporting surfaces 12 and 13. The blocking elements 21 include a shaft portion 23 and a head portion 24, the shaft portion 23 being receivable within the aperture 22 with the head portion 24 lying substantially flush against the upper surface of the flange 12. The blocking element 21 is preferably made non-removable, and for this purpose the head 24 is provided with a "ratchet type" screwdriver slot formation providing generally vertical surfaces 24a for facilitating rotation of the blocking element in a clockwise direction and sloping or cam surfaces 24b, which render it virtually impossible to rotate the element counterclockwise by such screwdriver. In addition, the blocking element 21 includes a locking portion comprising a generally U-shaped wire member 25 passing through an opening in the shaft 23 at a point which is below the lower surface of the breaker supporting portion 12 when the element is in its mounted position. The apertures 22 each comprise a generally circular central portion and opposed notches contiguous therewith, the central portion serving to receive the shaft 23 of the blocking element 21 and the opposed notches serving to receive the corresponding portions of the wire locking element 25. The clearance between the ends of the wire locking element 25 and the under surface of the head portion 24 is preferably chosen to be slightly less than the thickness of the circuit breaker supporting portion 12. Upon rotation of the blocking element 21, the wire locking member 25 is twisted and deformed as shown in Figures 1 and 5a. In such distorted condition the wire locking member 25 prevents the removal of the blocking element 21 even when its ends are again brought into alignment with the notch portions of the aperture 22, since the bight portion of the wire locking member is always angularly displaced from the line connecting the notches.

For use at locations at which a blocking or discriminating element 21 has been mounted, I provide corresponding circuit breakers 26 having a recess 26 in the bottom wall thereof which is adapted to receive the head 24 of the discriminating element 21 to permit the circuit breaker 20 to be rotated to a fully mounted position, as indicated in Figure 1, despite such blocking element. If it is attempted to mount a circuit breaker such as circuit breaker 30 at a location where a discriminating element 21 has been mounted, the head 24 of the discriminating element will engage a portion of the bottom wall 31 of the circuit breaker 30 thereby substantially preventing rotation of the circuit breaker 30 to a fully mounted position.

In practice, the panelboard user (usually an electrical contractor) purchases a panelboard assembly comprising the circuit breaker supporting means and bus bar assembly, and separately purchases the circuit breakers having the particular ratings he desires. With each of the circuit breakers of the type such as shown at 26, that he buys, the purchaser receives a blocking or discriminating element 21. When the contractor installs and connects the panelboard and its various circuit breakers to the circuits which they are to control, he inserts a discriminating element 21 at each location where a breaker 26 is to be used. Since such initial installation is almost invariably performed by qualified personnel and is subjected to careful inspection and approval by municipal authorities, it can be depended upon that such discriminating elements will be properly installed. Since it is usually desired that breakers having a high ampere rating shall not be mounted at locations where a breaker of low ampere rating is required, I preferably make the circuit breakers 26 of low ampere rating and the circuit breakers 30 of higher ampere rating. Accordingly therefore, at the selected locations where a discriminating element 21 has been mounted, it thereafter is possible only to mount circuit breakers of low ampere rating. Such circuit breakers of low ampere rating may also, of course, be mounted at other locations where a breaker of high ampere rating has previously been mounted and having no discriminating or blocking element. The absence of a discriminating element at such locations, in other words, indicates that a circuit breaker of high rating may be mounted there, and the substitution, therefore, of a low ampere rated circuit breaker would not be dangerous, but would amount to providing more protection than is needed, rather than less. Discriminating elements may, of course, be mounted or added at any later time at a location where a breaker of high ampere rating was initially mounted.

In Figure 6, I have shown another type of blocking element which may be used with my invention. In this form I provide a conventional type of machine screw 21' having a "ratchet type" head. The corresponding aperture 22 is simply a hole tapped to receive the screw 22'.

In Figure 7 I have shown still another type of blocking element which may be used. In this form, the blocking element 21" is of the snap-in type and comprises a tubular headed member having a plurality of outwardly projecting locking lugs 27. The corresponding aperture 22" is simply a hole through which the locking element 21" is adapted to be pushed, the lugs 27 being forced inwardly and then snapping out to engage the underside of the surface 12" to prevent extracting the element.

It will be seen that I have provided a circuit breaker panelboard including circuit breaker supporting and energizing means and discrete blocking or discriminating means and circuit breakers especially adapted for use therewith, which is simple and inexpensive and which can be easily added to the panelboard but cannot be easily removed, whereby a user is substantially prevented from mounting a circuit breaker of high rating at a location at which such discriminating means has been mounted.

While I have shown my invention is practical with certain particular apparatus and arrangements, it will be readily apparent that many modifications thereof may be made without departing from the general scheme of the invention. Thus, for example, while I have shown manually and automatically operable circuit breakers 20, 26, and 30, it will be readily apparent that the invention may be practiced with circuit breakers without regard to their method of operation, including those operating by fusible means. Accordingly, I intend, by the appended claims, to cover all modifications as fall within the true spirit and scope of the invention.

What I claim as new and desire to secure by Letters Patent of the United States is:

1. An electric circuit breaker panelboard comprising a support, means for selectively mounting at a given location on said support at least two electric circuit breakers having mounting portions thereof substantially identical except for a relatively minor difference in one portion thereof, and blocking means adapted to be non-removably attached to said support at said mounting location to prevent the mounting of a predetermined one of said circuit breakers at said location thereafter by engagement with said one portion of the casing thereof.

2. The invention as set forth in claim 1 wherein the support comprises a portion having an aperture therein and the blocking means comprises a headed stud adapted to be received within said aperture.

3. An electric circuit breaker panelboard comprising a support, a plurality of circuit breaker mounting locations on said support, at least two circuit breakers adapted to be mounted at said mounting locations on said support and having mounting portions substantially identical except for a relatively minor difference in one portion thereof, and blocking means adapted to be non-removably attached to said support at a selected mounting location to prevent the mounting of one of said circuit breakers at said selected location thereafter by engagement with said one portion of the casing thereof.

4. The invention as set forth in claim 3 wherein the support comprises a portion having an aperture therein and the blocking means comprises a headed stud adapted to be received within said aperture.

5. An electric circuit breaker panelboard comprising a support, first and second circuit breakers mounted on said support at predetermined first and second mounting locations and each including an insulating casing having a mounting portion, blocking means non-removably attached to said support at said first mounting location, said second circuit breaker casing mounting portion including an interfering portion adapted to engage said blocking element to prevent mounting said second circuit breaker at said first mounting location, said mounting portion of said second circuit breaker being substantially identical with the mounting portion of said first circuit breaker except for said interfering portion.

6. An electric circuit breaker panelboard comprising a support, a relatively stationary contact on said support, circuit breaker mounting and retaining means carried by said support and adapted to receive a portion of a circuit breaker casing and to facilitate the pivotal movement of said circuit breaker about said retaining means into electrical contact with said relatively stationary contact, said support being adapted to receive a blocking element closely adjacent to said circuit breaker retaining means to restrict pivotal movement of a predetermined circuit breaker about said retaining means to prevent its engagement with said stationary contact.

7. An electric circuit breaker panelboard comprising a support, a relatively stationary electrical contact carried by said support, circuit breaker mounting and retaining means spaced away from said relatively stationary contact and adapted to receive an end portion of a circuit breaker casing and to facilitate pivotal rotation thereof about said retaining means into electrical contact with said relatively stationary contact at the other end, blocking means adapted to be mounted on said support close to said breaker retaining means and adapted to engage a portion of the casing of a predetermined type of circuit breaker whereby to effectively prevent rotation of said circuit breaker about said retaining means into contact with said relatively stationary contact.

8. The invention as set forth in claim 7 wherein the support comprises a portion closely adjacent said breaker retaining means having an aperture therein and the blocking means comprises a headed stud receivable within said aperture.

9. An electric circuit breaker panelboard comprising a support, a plurality of relatively stationary contacts carried by said support, a plurality of circuit breaker mounting and retaining means on said support, each of said retaining means being spaced away from a corresponding relatively stationary contact, at least two electric circuit breakers having enclosing casings including a portion adapted to be received by said circuit breaker retaining means, said circuit breakers having a contact at the other end of said casing adapted to make contact with one of said relatively stationary contacts when said circuit breaker is rotated about said retaining means to full mounted position, blocking means mounted on said support adjacent at least one of said breaker retaining means, at least one of said circuit breakers having a casing portion adapted to be engaged by said blocking means to prevent pivotal movement of said circuit breaker about said retaining means into fully mounted position and at least one other circuit breaker having a casing adapted to avoid engagement with said blocking means to permit pivotal movement thereof into fully mounted position.

10. An electric circuit breaker panelboard as set forth in claim 9 wherein the support includes a portion adjacent one of said breaker retaining means having an aperture therein and said blocking means comprises a member non-removably received within said aperture.

11. An electric circuit breaker panelboard as set forth in claim 9 wherein the support comprises a portion adjacent one retaining means having an aperture therein and the blocking means comprises a headed stud receivable within said aperture and having a headed portion adapted to project above the surface of said support, one of said circuit breakers having a corresponding recess in the casing thereof is adapted to receive the head of said stud when said circuit breaker is in fully mounted position.

12. An electric circuit breaker panelboard as set forth in claim 11 wherein the blocking stud is adapted to be inserted within the aperture by movement including rotation thereof about its central axis, the head of said stud having formations facilitating rotation of said element in the locking direction but rendering rotation of said stud in the opposite direction substantially impossible.

13. The panelboard as set forth in claim 10 wherein the blocking stud includes a reduced shank portion, a resilient locking member carried by said reduced shank portion comprising a generally U-shaped wire member having its bight passing through the end portion of said reduced shank transversely thereof and the said enlarged head portion of said blocking stud includes shoulder portions and cam portions adapted to facilitate rotation of said fastening element in a locking direction but providing no means for rotating said locking element in a direction opposite to said locking direction, and wherein the aperture in the support includes a generally circular central portion and opposed slot portions communicating with said central portion to permit entry of said locking fastening element in its normal condition but to prevent removal of said fastening element therefrom following rotation thereof in a locking direction.

14. For use with an electric circuit breaker panelboard of the type adapted to receive and mount electric circuit breakers by movement including pivotal movement about one end thereof into plug-in type electrical contact at the other end thereof, the combination of an electric circuit breaker and blocking means for preventing the mounting of a circuit breaker other than said circuit breaker at a predetermined location in said panelboard, said circuit breaker comprising an enclosing casing having a portion adapted to be received by breaker retaining means carried by said panelboard and to be rotated thereabout and plug-in type electrical contact at the other end of said circuit breaker, a blocking element adapted to be mounted in said electric circuit breaker panelboard adjacent said breaker retaining means, said circuit breaker having its enclosing casing adjacent said mounting portion adapted to receive at least a portion of said blocking element when said circuit breaker is in fully mounted position.

References Cited in the file of this patent

UNITED STATES PATENTS

| | | |
|---|---|---|
| 2,281,958 | Snavely | May 5, 1942 |
| 2,647,225 | Cole | July 28, 1953 |
| 2,738,473 | Johnson | Mar. 13, 1956 |
| 2,766,405 | Edmunds | Oct. 9, 1956 |
| 2,767,353 | Kingdon | Oct. 16, 1956 |

OTHER REFERENCES

Federal Noark Catalog 1000A, July, 1953.
Electronic Equipment, page 2, July, 1954.